US010860221B1

(12) United States Patent
Shveidel et al.

(10) Patent No.: US 10,860,221 B1
(45) Date of Patent: Dec. 8, 2020

(54) PAGE WRITE TO NON-VOLATILE DATA STORAGE WITH FAILURE RECOVERY

(71) Applicant: EMC IP Holding Company LLC, Hopkinton, MA (US)

(72) Inventors: Vladimir Shveidel, Pardes-Hana (IL); Ronen Gazit, Tel Aviv (IL)

(73) Assignee: EMC IP Holding Company LLC, Boston, MA (US)

( * ) Notice: Subject to any disclaimer, the term of this patent is extended or adjusted under 35 U.S.C. 154(b) by 0 days.

(21) Appl. No.: 16/503,804

(22) Filed: Jul. 5, 2019

(51) Int. Cl.
*G06F 13/00* (2006.01)
*G06F 3/06* (2006.01)
*G06F 12/1009* (2016.01)

(52) U.S. Cl.
CPC ............ *G06F 3/0619* (2013.01); *G06F 3/064* (2013.01); *G06F 3/0611* (2013.01); *G06F 3/0623* (2013.01); *G06F 3/0679* (2013.01); *G06F 12/1009* (2013.01)

(58) Field of Classification Search
CPC .... G06F 3/0619; G06F 12/1009; G06F 3/064; G06F 3/0679; G06F 3/0611; G06F 3/0623
See application file for complete search history.

(56) References Cited

U.S. PATENT DOCUMENTS

| | | | | |
|---|---|---|---|---|
| 4,945,474 A | * | 7/1990 | Elliott | G06F 11/1471 707/999.202 |
| 5,333,303 A | * | 7/1994 | Mohan | G06F 11/1471 714/20 |
| 5,418,940 A | * | 5/1995 | Mohan | G06F 11/08 707/999.202 |
| 7,254,685 B1 | * | 8/2007 | Cardente | G06F 11/2066 707/999.201 |
| 9,122,689 B1 | | 9/2015 | Bono et al. | |
| 9,280,578 B1 | | 3/2016 | Zhou et al. | |
| 10,120,587 B2 | | 11/2018 | Aron et al. | |
| 10,169,387 B1 | | 1/2019 | Zhao et al. | |
| 2009/0276586 A1 | * | 11/2009 | Royer | G06F 12/0246 711/154 |

(Continued)

OTHER PUBLICATIONS

"Recovery of Data Pages After Partial Page Writes" by IBM Technical Disclosure Bulletin, Aug. 1991 (Year: 1991).*

(Continued)

*Primary Examiner* — Jing-Yih Shyu
(74) *Attorney, Agent, or Firm* — BainwoodHuang

(57) ABSTRACT

Modifications to be made to a page of non-volatile data storage and a current transaction sequence number are store into a protected memory. The current transaction sequence number is added to a previous version of the page and the modifications are applied to the previous version of the page to create a new version of the page that is written to the non-volatile data storage. A failure of the write may cause the stored modifications to be re-applied to the page in response to a transaction sequence number in a retrieved version of the page not matching the saved current transaction sequence number. A write completion status stored in a protected memory may indicate which ones of multiple copies of the page have been overwritten with the new version. Alternatively, an error-detecting code may be generated and written to non-volatile data storage with the new version to the multiple copies.

15 Claims, 9 Drawing Sheets

(56) References Cited

U.S. PATENT DOCUMENTS

| | | | |
|---|---|---|---|
| 2014/0006683 A1* | 1/2014 | Ratn | G06F 12/1009 |
| | | | 711/102 |
| 2015/0261674 A1* | 9/2015 | Wei | G06F 12/0868 |
| | | | 711/135 |
| 2019/0102296 A1* | 4/2019 | Natarajan | G06F 11/1402 |

OTHER PUBLICATIONS

Koopman, Philip., "32-Bit Cyclic Redundancy Codes for Internet Applications", DSN '02 Proceedings of the 2002 International Conference on Dependable Systems and Networks, IEEE Computer Society Washington, DC, USA, Jun. 23-26, 2002, 11 pages.

Sainio, Arthur, "NVDIMM—Changes Are Here So Whats Next?", In-Memory Computing, Summit 2016, <<https://www.snia.org/sites/default/files/SSSI/NVDIMM%20-%20Changes%20are%20Here%20So%20What%27s%20Next%20-%20final.pdf>> Article accessed on Jul. 29, 2019, 22 pages.

* cited by examiner

PAGE WRITE TO NON-VOLATILE DATA STORAGE WITH FAILURE RECOVERY

TECHNICAL FIELD

The present disclosure relates generally to intelligent data storage system technology, and more specifically to performing page writes to non-volatile data storage with failure recovery.

BACKGROUND

Data storage systems are arrangements of hardware and software that include non-volatile data storage devices (e.g. electronic flash drives, magnetic disk drives, and/or optical drives) that are used to provide non-volatile data storage for processing host I/O (Input/Output) requests (i.e. write requests and/or read requests) received from one or more host computers. The host I/O requests that are processed by a data storage system may include block I/O requests and/or file I/O requests. The host I/O requests indicate host data that is stored in the non-volatile data storage contained in and/or maintained by the data storage system.

SUMMARY

In many cases an application, such as an application executing within a data storage system and responsible for processing host I/O requests, must perform an in-place write of a page to non-volatile data storage. Successful completion of an in-place page write overwrites the previous contents of the page in the non-volatile data storage. For example, under some circumstances, an in-place page write may need to be performed when an application writes the application's metadata to the non-volatile data storage, in order to avoid the need to maintain a large indirection table.

Non-volatile data storage devices may not provide atomicity for in-place page writes performed by an application. For example, non-volatile data storage devices in a data storage system may not provide atomicity for page writes that are performed by applications running within the data storage system, e.g. when the page size used by the application is different from the page size used within the non-volatile data storage. Such a case may arise, for example, when an application (e.g. an application executing within the data storage system) uses a page size of 4 KB, while the non-volatile data storage devices in the data storage system use a page size of 512 B. Another example of when non-volatile data storage devices may not provide atomicity for page writes performed by one or more applications has arisen in previous technologies because there is no protected memory for the non-volatile data storage devices to use to store state information during the processing of in-place page writes.

When atomicity of page writes is not guaranteed by non-volatile data storage devices, certain failure conditions may result in an application not being guaranteed that after the page write is issued to the non-volatile data storage, the non-volatile data storage devices will subsequently hold a valid page, i.e. either the page in its unmodified pre-write state, or the modified page after the write has been performed. Instead, after a failure occurring during the processing of the page write, any combination of the unmodified page and/or modified page may be present in the non-volatile data storage.

Additionally, for performance purposes it may sometimes be undesirable for an application to maintain a complete copy of the new version of page that includes the modifications made by the page write within a protected memory so that the entire new version of the page can subsequently be re-written after a failure of the initial write. Instead, it may be preferable from a performance and/or resource allocation standpoint for the application to store only a delta-change set of modifications that are being made to the page within the protected memory. Such performance considerations may arise when the bandwidth of a protected memory accessed by the application is limited, and the use of such protected memory must accordingly be optimized.

Since some delta-change sets of modifications stored by the application may be non-idempotent, they cannot simply be reapplied after a failure to copies of the page stored in the non-volatile data storage without first determining whether the delta-change modifications were successfully applied before the failure occurred. For example, this may be the case when the page write increments or decrements a reference counter that is part of the application's metadata. Under such circumstances, if the page write failed (e.g. due to power-loss, reboot, etc.), some previous technologies could not guarantee that the non-volatile data storage contained a valid copy of the page, i.e. either the old unmodified version or the post-write modified page. If the application maintained only a delta-change set of modifications representing the changes to the page to be made by the page write, recovery of the page to either its original or modified state could be impossible, potentially resulting in page-loss or data corruption.

In order to address the above described and other shortcomings of previous technologies, new technology for performing an in-place write of a page to non-volatile data storage with failure recovery is provided herein. In the disclosed technology, a set of modifications and a current transaction sequence number are saved, and a new version of the page is created by i) adding the current transaction sequence number to a previous version of the page, and ii) applying the set of modifications to the previous version of the page. The new version of the page is then written to the non-volatile data storage. In response to a failure, a current version of the page is retrieved from the non-volatile data storage, and the set of modifications is re-applied to the page in response to the current transaction sequence number not matching a transaction sequence number contained in the current version of the page.

In some embodiments, saving the current transaction sequence number and the set of modifications may be performed by storing the current transaction sequence number and the set of modifications to a protected memory.

In some embodiments, prior to saving the current transaction sequence number in the protected memory, the current transaction sequence number may be generated by incrementing the value of a last previously used transaction sequence number.

In some embodiments, in response to the failure, the transaction sequence number contained in the current version of the page may be compared to the current transaction sequence number, and the set of modifications to the page may be re-applied in response to the transaction sequence number contained in the current version of the page being less than the current transaction sequence number.

In some embodiments, multiple copies of the page may be maintained in the non-volatile data storage, and each one of the multiple copies may contain a transaction sequence number. In response to the new version of the page being written to the non-volatile data storage, each of the multiple copies of the page in the non-volatile data storage may be overwritten with the new version of the page. After each one of the multiple copies of the page is overwritten with the new version of the page, a write completion status stored in protected memory may be updated to indicate which ones of the multiple copies of the page have been successfully overwritten with the new version of the page.

In some embodiments, in response to the failure, one of the multiple copies of the page may be selected as the current version of the page based on the write completion status stored in the protected memory.

In some embodiments, selection of one of the multiple copies of the page as the current version of the page may be based on the completion status stored in the protected memory such that in response to the completion status stored in the protected memory indicating that no copies of the multiple copies of the page have been successfully overwritten with the new version of the page, one of the multiple copies of the page is selected as the current version of the page that is the same as the previous version of the page.

In some embodiments, selection of one of the multiple copies of the page as the current version of the page may be based on the completion status stored in the protected memory such that in response to the completion status stored in the protected memory indicating that at least one of the multiple copies of the page has been successfully overwritten with the new version of the page, one of the multiple copies of the page is selected as the current version of the page that is the same as the new version of the page.

In some embodiments in which multiple copies of the page are maintained in the non-volatile data storage, each copy of the page stored in the non-volatile data storage may have an error-detecting code stored with it. In such embodiments, an error-detecting code (e.g. CRC) may be calculated for the new version of the page, and the error-detecting code for the new version of the page may be added to the new version of the page before the new version of the page is written to the non-volatile data storage. In response to a failure, one of the copies of the page may be selected as the current version of the page, such that the error-detecting code for the copy selected as the current version of the page indicates that the contents of the selected copy of the page have not been corrupted.

Embodiments of the disclosed technology may provide significant improvements over previous technologies. For example, the disclosed technology may provide an application, such as an application executing within a data storage system, with the ability to recover from a failure that occurs while an in-place write of a page of data is being performed to non-volatile data storage, even when the non-volatile data storage devices in the data storage system do not provide atomicity for in-place page writes performed by the application. Embodiments of the disclosed technology enable the application to retrieve a current version of the page from non-volatile data storage after the failure is detected, and to accurately determine whether the current version of the page is the same as the pre-write, unmodified version of the page, or instead is the same as the new version of the page after the desired changes have successfully been made. In the case where the current version of the page retrieved from non-volatile data storage after the failure is the same as the version of the page prior to modification by the page write, the application can safely re-apply the saved modifications to the page, even when the change being made is non-idempotent, e.g. as in the incrementing of a reference counter. In the case where the current version of the page retrieved after the failure is the same as the new version of the page after being modified by the page write, the application need not re-apply the saved modifications, and the saved modifications may be discarded from protected memory. As a further advantage, only the set of modifications representing the delta-change between the previous version of the page and the new, modified version of the page needs to be saved by the application in protected memory while the transaction is underway, instead of the entire new version of the page, thus lowering the amount of protected memory bandwidth that must be used for each transaction. In embodiments in which an error-detection code is stored with each copy of the page in non-volatile data storage, there is no need for the logic that writes the non-volatile data storage to have its own protected memory, or access shared protected memory. Such embodiments provide a solution that is applicable to systems in which the non-volatile data storage write logic does not have its own protected memory, or access to a shared protected memory, and/or advantageously reduces the overall amount of protected memory consumption.

BRIEF DESCRIPTION OF THE DRAWINGS

The foregoing and other objects, features and advantages will be apparent from the following description of particular embodiments of the disclosed technology, as illustrated in the accompanying drawings in which like reference characters refer to the same parts throughout the different views. The drawings are not necessarily to scale, emphasis instead being placed upon illustrating the principles of various embodiments of the disclosed technology.

DETAILED DESCRIPTION

Embodiments of the invention will now be described. The embodiments described herein are only examples of how features and principles of the invention may be embodied. The invention itself is accordingly broader than the examples described below.

The technology disclosed herein provides in-place page writes to non-volatile data storage with failure recovery. In the disclosed technology, when an application performs an in-place write of a page to non-volatile data storage, the application saves i) a set of modifications that are being made to the page by the page write, and ii) a current transaction sequence number, to a protected memory. The application also creates a new version of the page in memory by i) adding the current transaction sequence number to a previous version of the page that it has previously read from the non-volatile data storage, and ii) applying the set of modifications to the previous version of the page. The application then writes the new version of the page from memory to the non-volatile data storage. In response to a subsequently detected failure, a current version of the page is retrieved by the application from the non-volatile data storage, and the set of modifications is re-applied by the application to the current version of the page only in response to the current transaction sequence number saved in the protected memory not matching a transaction sequence number contained in the current version of the page retrieved from the non-volatile data storage in response to the failure (e.g. only when the current transaction sequence number is less than the transaction sequence number contained in the current version of the page). In some embodiments, multiple copies of the page may be stored in the non-volatile data storage, and a write completion status may be stored in a protected memory while the page is being written to indicate which ones of the multiple copies of the page have been successfully overwritten with the new version. Alternatively, an error-detecting code may be generated by the application for the new version of the page and then written to non-volatile data storage as part of the new version of the page, and accordingly stored in each of the multiple copies of the page maintained in the non-volatile data storage.

Figure 1:
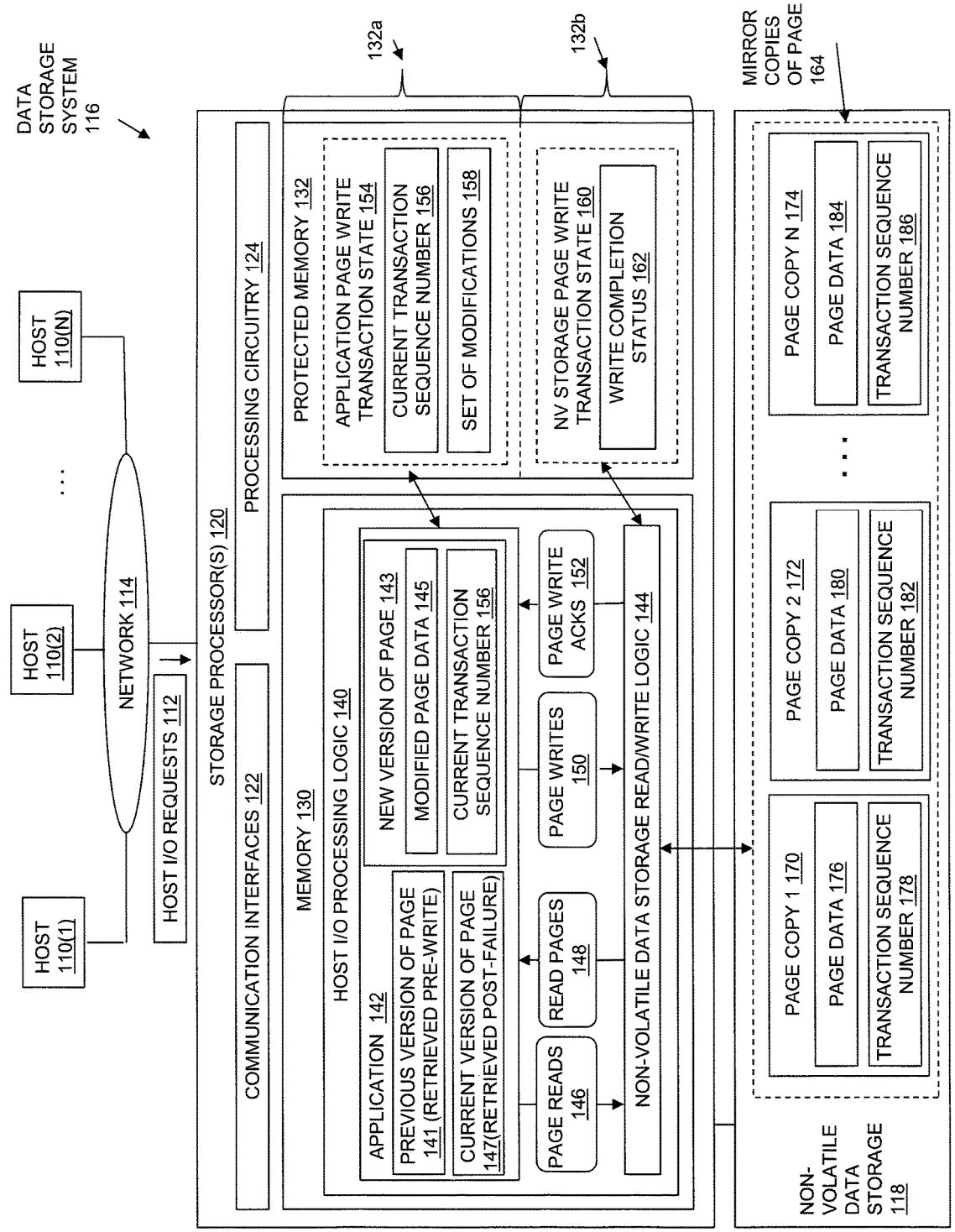
FIG. 1 is a block diagram showing an example of components in some embodiments and an operational environment.

FIG. 1 shows an example of an operational environment in which embodiments of the disclosed technology may operate, and illustrates components in and operation of some embodiments of the disclosed technology. As shown in FIG. 1, one or more host computers ("Hosts"), shown as host computers 110(1) through 110(N), and/or host applications executing in whole or in part on host computers 110(1) through 110(N), access non-volatile data storage provided by Data Storage System 116 over a Network 114. Data Storage System 116 includes at least one Storage Processor 120 and Non-Volatile Data Storage 118. Data Storage System 116 may include one or more storage processors like Storage Processor 120. In some embodiments, multiple storage processors may be provided as circuit board assemblies, or "blades," and may be plugged into one or more chassis that enclose and cool the storage processor. In some embodiments, Data Storage System 116 may include or consist of one or more devices sometimes referred to as "storage appliances". Those skilled in the art will recognize, however, that no particular configuration of storage processors is required, as any number of storage processors, including a single storage processor, may be provided and that Storage Processor 120 may be embodied as any specific type of physical or virtual computing device or devices capable of processing host I/O requests.

Non-Volatile Data Storage 118 may include or consist of some number of data storage drives. The drives in Non-Volatile Data Storage 118 may include electronic flash drives, magnetic disk drives, optical drives, and/or other types of non-volatile data storage drives and/or data storage devices. In some embodiments, Non-Volatile Data Storage 118 may include or consist of solid state drives that are provided based on high performance technologies such as 3D XPoint non-volatile memory (NVM) technology or the like.

Non-Volatile Data Storage 118 persistently stores pages of data that are written by Application 142 to Non-Volatile Data Storage 118, e.g. by Application 142 issuing page writes to Non-Volatile Data Storage Read/Write Logic 144. Each page of data written to Non-Volatile Data Storage 118 by Application 142 has the same length, which may be a page size that is used by the Application 142. In some embodiments, a page size used within Non-Volatile Data Storage 118 may be different from the page size used by the Application 142. Embodiments of the disclosed technology are not limited any particular page size.

In some embodiments, RAID (Redundant Array of Independent Disks) technology and/or data mirroring may be used to provide fault tolerance with regard to the pages in Non-Volatile Data Storage 118. As a result, multiple identical copies of each page written to Non-Volatile Data Storage 118 by Application 142 may be maintained in Non-Volatile Data Storage 118. For example, in some embodiments Non-Volatile Data Storage Read/Write Logic 144 may organize Non-Volatile Data Storage 118 into RAID groups, where each RAID group is composed of multiple drives in Non-Volatile Data Storage 118. In another example, Non-Volatile Data Storage Read/Write Logic 144 may perform data mirroring that results in multiple "mirror" copies of each page written by Application 142 to Non-Volatile Data Storage 118 being simultaneously stored in Non-Volatile Data Storage 118.

Network 114 may include or consist of any type of network or combination of networks, such as, for example, a storage area network (SAN), a local area network (LAN), a wide area network (WAN), the Internet, and/or some other type of network or combination of networks.

Hosts 110(1-N) and/or host applications executing in whole or in part on Hosts 110(1-N) may logically connect to and communicate with the Storage Processor 120 using various technologies. For example, Host I/O Requests 112 conveyed from Hosts 110(1-N) to Storage Processor 120 may include block I/O requests (read requests and/or write requests) communicated from Hosts 110(1-N) to Storage Processor 120 using block storage interfaces and protocols such as, for example, the Small Computer System Interface (SCSI), Fibre Channel (FC), Serial Attached SCSI (SAS), Internet Small Computer System Interface (iSCSI), and/or other block storage interfaces and/or protocols. Host I/O Requests 112 conveyed from Hosts 110(1-N) to Storage Processor 120 may further include or consist of file I/O requests (read requests and/or write requests) communicated from Hosts 110(1-N) to the Storage Processor 120 using file storage interfaces and protocols such as, for example, the Network File System (NFS) distributed file system protocol, the Server Message Block (SMB)/Common Internet File System (CIFS) application-layer network protocol, Apple Filing Protocol (AFP), and/or other file storage interfaces and/or protocols. Storage Processor 120 may accordingly be configured to receive host I/O requests through block-based and/or file-based storage protocols, and to respond to host I/O requests of either type by reading and/or writing the Non-Volatile Data Storage 118.

Storage Processor 120 may include one or more Communication Interfaces 122, Processing Circuitry 124, and Memory 130. The Communication Interfaces 122 of Storage Processor 120 may include, for example, SCSI target adapters and/or network interface adapters that convert electronic and/or optical signals received over Network 114 into electronic form for use by Storage Processor 120.

Processing Circuitry 124 may be embodied as at least one processor core that is capable of independently reading and executing program instructions as they are scheduled for execution. Processing Circuitry 124 may be integrated into a single central processing unit chip or chip package. Processing Circuitry 124 may be a subset of the processor cores contained in Storage Processor 120, or may be the only processor core contained in Storage Processor 120.

Memory 130 may include or consist of volatile memory, such as DRAM (Dynamic Random Access Memory) and/or Static Random Access Memory (SRAM). Protected Memory 132 includes or consists of non-volatile memory, such as NVRAM (Non-Volatile Random Access Memory), RAM having a battery backup, and/or NVDIMM (Non-Volatile Dual In-line Memory Module). Protected Memory 132 retains data that is stored within it even under power-related failure conditions, such as when power to Storage Processor 120 and/or Data Storage System 116 is lost, and/or when Storage Processor 120 and/or Data Storage System 116 is rebooted.

Figure 6:
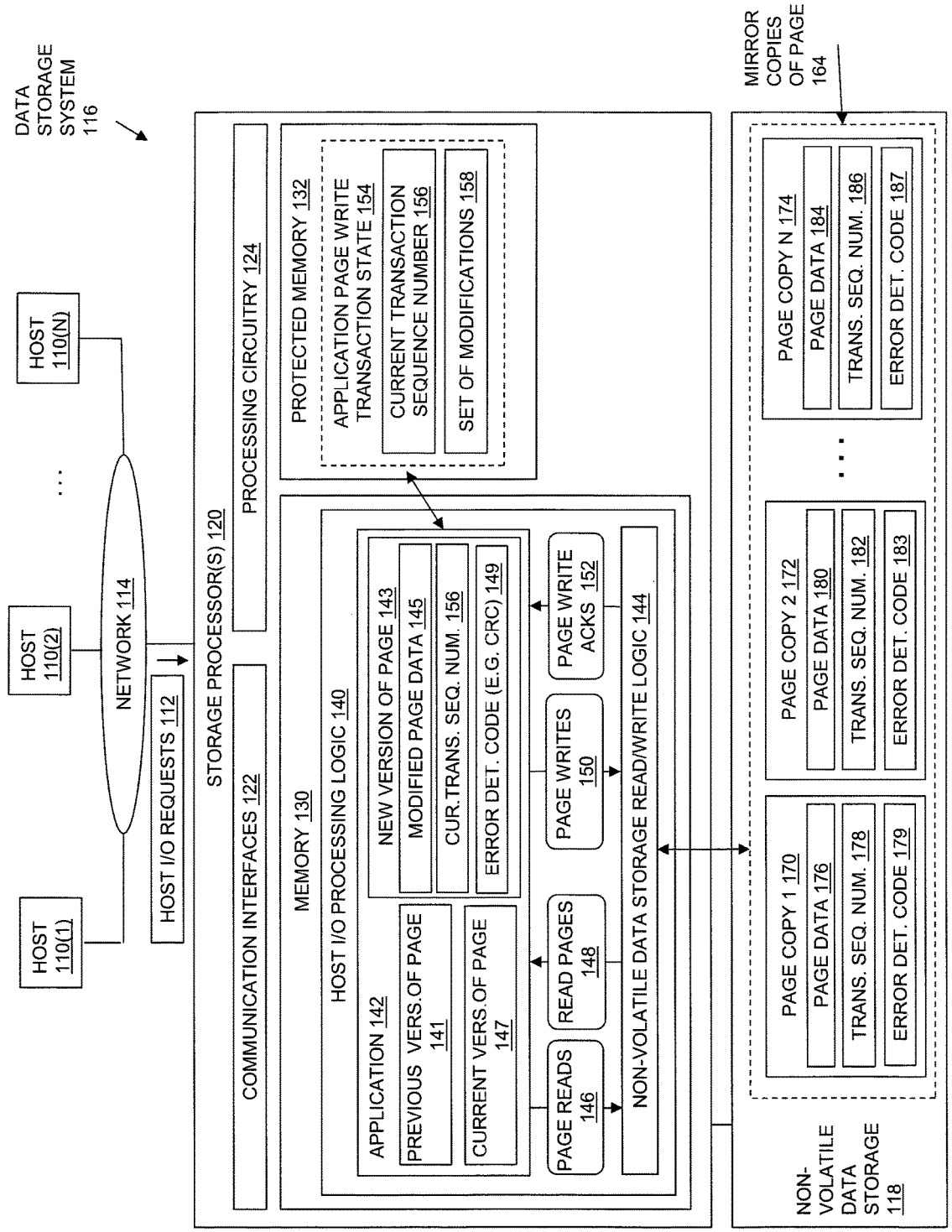
FIG. 6 is a block diagram showing another example of components in some alternative embodiments and an operational environment.

While for purposes of illustration Protected Memory 132 is shown contained within Storage Processor 120, the disclosed technology is not limited to such embodiments. Protected Memory 132 may be divided into i) Protected Memory 132a, which is accessed by Application 142, and ii) Protected Memory 132b, which is accessed by Non-Volatile Data Storage Read/Write Logic 144. While Protected Memory 132a and Application 142 are both typically located in Storage Processor 120, and while either one or both of Non-Volatile Data Storage Read/Write Logic 144 and/or Protected Memory 132b may also be located in Storage Processor 120, either one or both of Non-Volatile Data Storage Read/Write Logic 144 and/or Protected Memory 132b may alternatively be located wholly or partly in Non-Volatile Data Storage 118. For example, in some embodiments, some or all of Non-Volatile Data Storage Read/Write Logic 144 may be located in memory and execute on processing circuitry that is located in one or more devices (e.g. storage devices) within Non-Volatile Data Storage 118, and access either a Protected Memory 132b that is located in Storage Processor 120, or alternatively a Protected Memory 132b that is located in Non-Volatile Data Storage 118. As illustrated in FIG. 6 and described below with reference to FIGS. 6-9, in some alternative embodiments, Non-Volatile Data Storage Read/Write Logic 144 may not need to access any of Protected Memory 132, thus eliminating the need for Protected Memory 132b in either the Storage Processor 120 or within the Non-Volatile Data Storage 118, and/or reducing or eliminating the use of Protected Memory 132 by Non-Volatile Data Storage Read/Write Logic 144.

Processing Circuitry 124, Memory 130, and Protected Memory 132 together may form specialized control circuitry, which is constructed and arranged to carry out specific methods and functions as described herein. As shown in FIG. 1, Memory 130 and/or Protected Memory 132 may store specialized software components and/or data structures that may be provided at least in part in the form of executable program instructions. When the executable instructions of the software components shown in FIG. 1 are executed by Processing Circuitry 124, Processing Circuitry 124 performs the methods and functionality of the software.

Although certain specific software constructs are shown in FIG. 1 and described herein, those skilled in the art will recognize that Memory 130 and/or Protected Memory 132 may additionally store various other types of software constructs, which are not shown.

In the example of FIG. 1, the software components in Memory 130 include Host I/O Processing Logic 140, which may include both Application 142 and Non-Volatile Data Storage Read/Write Logic 144, and which provides some or all of the program logic for processing and/or supporting the processing of the Host I/O Requests 112 that are received by Storage Processor 120. Host I/O Requests 112 processed by Host I/O Processing Logic 140 may include host I/O requests (e.g. host I/O read requests, host I/O write requests) directed to various types of block data objects hosted by Data Storage System 116 using Non-Volatile Data Storage 118, such as logical disks (e.g. logical units sometimes referred to as LUNs) and/or block-based virtual volumes (VVols). Host I/O Requests 112 processed by Host I/O Processing Logic 140 may also or alternatively include host I/O requests (e.g. host I/O read requests, host I/O write requests) directed to file data objects hosted by Data Storage System 116 using Non-Volatile Data Storage 118, such as files or file systems.

During the processing of Host I/O Requests 112, Application 142 writes pages of data to the Non-Volatile Data Storage 118, e.g. by issuing page writes to Non-Volatile Data Storage Read/Write Logic 144. Page writes performed by Application 142 to Non-Volatile Data Storage 118 may include or consist of writes of pages of application metadata that is used by Application 142 (e.g. page writes that make non-idempotent changes to application metadata of Application 142, such as page writes that increment or decrement one or more reference counters in metadata maintained by Application 142 in Non-Volatile Data Storage 118, etc.), and/or of host data received in the Host I/O Requests 112 (e.g. page writes performed by Application 142 to Non-Volatile Data Storage 118 in order to store host data that was received by Data Storage System 116 in one or more host write requests within Host I/O Requests 112, etc.).

As shown in FIG. 1, in some embodiments, Application 142 may read and write Non-Volatile Data Storage 118 by issuing page reads and page writes to Non-Volatile Data Storage Read/Write Logic 144. For example, Application 142 may read pages of data from Non-Volatile Data Storage 118 by issuing page reads to Non-Volatile Data Storage Read/Write Logic 144, as shown by Page Reads 146. Non-Volatile Data Storage Read/Write Logic 144 processes each page read received from Application 142 by retrieving the requested page from Non-Volatile Data Storage 118, and passing the retrieved page to Application 142, e.g. in Read Pages 148.

In another example, Application 142 may write pages of data to Non-Volatile Data Storage 118 by issuing page writes to Non-Volatile Data Storage Read/Write Logic 144, as shown by Page Writes 150. Non-Volatile Data Storage Read/Write Logic 144 processes each page write received from Application 142 by overwriting all copies of the page that are stored in Non-Volatile Data Storage 118 with a new version of the page that is passed to Non-Volatile Data Storage Read/Write Logic 144 with the page write. When all copies of a page written by a page write have been successfully overwritten in Non-Volatile Data Storage 118 with the new version of the page received from Application 142, Non-Volatile Data Storage Read/Write Logic 144 sends an acknowledgement of the page write to Application 142, indicating successful completion of the page write, as shown in FIG. 1 by Page Write Acknowledgements 152.

As illustrated in the example of FIG. 1, in order to perform an in-place write of a page to Non-Volatile Data Storage 118 while providing failure recovery, Application 142 first saves a set of modifications to the page that are to be made by the page write. The saved set of modifications includes all the changes to the page that are to be made by the write, e.g. the modified data and the locations of the modified data within the page. The saved set of modifications is the difference, or "delta", between a previous version of the page that exists before the write, and a new version of the page resulting from the page write. The set of modifications is saved by Application 142 to a protected memory, such as Protected Memory 132. For example, as shown for purposes of illustration in FIG. 1, Application 142 saves Set of Modifications 158 to Protected Memory 132.

Application 142 also generates and saves a current transaction sequence number to Protected Memory 132, as shown by Current Transaction Sequence Number 156. Current Transaction Sequence Number 156 identifies a specific transaction through which the page is written to Non-Volatile Data Storage 118. In some embodiments, prior to saving Current Transaction Sequence Number 156 to Protected Memory 132, Application 142 may generate Current Transaction Sequence Number 156 by incrementing a transaction sequence number that was the last transaction sequence number previously used to perform a page write, e.g. to a next higher sequential value.

In addition to saving the Set of Modifications 158 and Current Transaction Sequence Number 156 to Protected Memory 132, Application 142 creates a new version of the page in Memory 130, e.g. New Version of Page 143. In order to create New Version of Page 143, Application 142 first reads, from Non-Volatile Data Storage 118 into Memory 130, the previous version of the page that is unmodified by the page write, e.g. by issuing a page read to Non-Volatile Data Storage Read/Write Logic 144. Non-Volatile Data Storage Read/Write Logic 144 retrieves Previous Version of Page 141 from Non-Volatile Data Storage 118 and passes Previous Version of Page 141 to Application 142. Application 142 then creates New Version of Page 143 from Previous Version of Page 141 in Memory 130 by applying the Set of Modifications 158 to Previous Version of Page 141 (e.g. by replacing portions of Previous Version of Page 141 that are to be modified by the page write with the modified data contained in Set of Modifications 158), and adding Current Transaction Sequence Number 156 to Previous Version of Page 141 (e.g. by overwriting a previous transaction sequence number contained in Previous Version of Page 141 with Current Transaction Sequence Number 156). As shown in FIG. 1, New Version of Page 143 then includes Modified Page Data 145 that has been modified to include all the changes in the Set of Modifications 158, and a copy of the Current Transaction Sequence Number 156.

Application 142 then writes New Version of Page 143 to Non-Volatile Data Storage 118, for example by passing New Version of Page 143 (e.g. an indication of or pointer to New Version 143) to Non-Volatile Data Storage Read/Write Logic 144, within one of the Page Writes 150. Upon receipt of the page write that passes New Version of Page 143 to Non-Volatile Data Storage Read/Write Logic 144, Non-Volatile Data Storage Read/Write Logic 144 begins overwriting the copies of the page that are stored in Non-Volatile Data Storage 118 with New Version of Page 143, as further described herein. In the example of FIG. 1, multiple copies of the page are maintained in Non-Volatile Data Storage 118 to provide fault tolerance, as shown in FIG. 1 by Mirror Copies of Page 164. The mirror copies of the page are shown in FIG. 1 by Page Copy 1 170, Page Copy 2 172, and so on through Page Copy N 174. Prior to the page write of New Version of Page 143 to Non-Volatile Data Storage 118, all of the copies of the page in Mirror Copies of Page 164 are identical, and contain a copy of a transaction sequence number that was used the last time the page was successfully written. For example, prior to the page write of New Version of Page 143, Page Data 176, Page Data 180, and so on through Page Data 184, are all identical, and Transaction Sequence Number 178, Transaction Sequence Number 182, and so on through Transaction Sequence Number 186 each contain a transaction sequence number that was used by Application 142 the last time the page was successfully written. For example, prior to the page write associated with Current Transaction Sequence Number 156, Page Copy 1 170, Page Copy 2 172, and so on through Page Copy N 174 may all be identical to Previous Version of Page 141.

After Application 142 passes a page write indicating New Version of Page 143 to Non-Volatile Data Storage Read/Write Logic 144, a failure may occur and be detected, e.g. prior to Non-Volatile Data Storage Read/Write Logic 144 having successfully overwritten all copies of the page in Non-Volatile Data Storage 118 (e.g. all copies of the page in Mirror Copies of Page 164) with New Version of Page 143 and sent the acknowledgement to Application 142 indicating that the page write was successfully completed. For example, such a failure may be a power-related failure, such as when power to Storage Processor 120 and/or Data Storage System 116 is lost, and/or when Storage Processor 120 and/or Data Storage System 116 is rebooted. Previous Version of Page 141 and New Version of Page 143 may be lost as a result of the failure. Advantageously, Current Transaction Sequence Number 156 and Set of Modifications 158 are both maintained across the failure because they were stored in Protected Memory 132. In response to detection of the failure, Application 142 determines that no acknowledgement indicating that the page write for Current Transaction Sequence Number 156 was received prior to the failure. The transaction identified by Current Transaction Sequence Number 156 is accordingly still open, and Application 142 must determine whether Set of Modifications 158 should be re-applied to the page. To do so, Application 142 retrieves a current version of the page, as the page exists following the failure, from Non-Volatile Data Storage 118, e.g. by issuing a page read to Non-Volatile Data Storage Read/Write Logic 144. The current version of the page that Application 142 retrieves in response to detecting the failure is shown for purposes of illustration in FIG. 1 by Current Version of Page 147. Application 142 extracts a transaction sequence number contained in Current Version of Page 147 to determine the transaction sequence number that was used the last time the page was successfully written. Application 142 then compares Current Transaction Sequence Number 156 to the transaction sequence number contained in Current Version of Page 147. In response to detecting that Current Transaction Sequence Number 156 does not match the transaction sequence number that is contained in Current Version of Page 147 (e.g. in response to detecting that the transaction sequence number contained in Current Version of Page 147 is less than Current Transaction Sequence Number 156), Application 142 re-applies Set of Modifications 158 to the page. Otherwise, if Current Transaction Sequence Number 156 matches the transaction sequence number that is contained in Current Version of Page 147, there is no need to reapply Set of Modifications 158 to the page.

For example, in response to the transaction sequence number contained in Current Version of Page 147 being less than Current Transaction Sequence Number 156, Application 142 may re-apply Set of Modifications 158 to the page by first re-creating New Version of Page 143 in Memory 130 using Current Version of Page 147. Application 142 may recreate New Version of Page 143 using Current Version of Page 147 by applying the Set of Modifications 158 to Current Version of Page 147 (e.g. by replacing portions of Current Version of Page 147 that are to be modified by the page write with the modified data contained in Set of Modifications 158), and adding Current Transaction Sequence Number 156 to Current Version of Page 147 (e.g. by overwriting the transaction sequence number contained in Current Version of Page 147 with Current Transaction Sequence Number 156). Application 142 may then re-perform the page write of New Version of Page 143 to Non-Volatile Data Storage 118, for example by issuing another page write to Non-Volatile Data Storage Read/Write Logic 144 indicating the re-created New Version of Page 143.

In some embodiments, in response to Application 142 issuing a page write indicating New Version of Page 143 to Non-Volatile Data Storage 118, Non-Volatile Data Storage Read/Write Logic 144 may, while overwriting the copies of the page maintained in Non-Volatile Data Storage 118, continuously update the value of Write Completion Status 162 such that the value of Write Completion Status 162 indicates which copies of the page in Non-Volatile Data Storage 118 have been successfully overwritten with New Version of Page 143. For example, Non-Volatile Data Storage Read/Write Logic 144 may initially store an initial value to Write Completion Status 162 upon receipt of the page write from Application 142, indicating that the page write has been started, but that no copies of the page have been successfully overwritten with New Version of Page 143. Such an initial value for Write Completion Status 162 may, for example, be a "START TRANSACTION" state or the like. After a first copy of the page is successfully overwritten with New Version of Page 143 (e.g. after Page Copy 1 170 is completely overwritten with New Version of Page 143), Non-Volatile Data Storage Read/Write Logic 144 then updates Write Completion Status 162 to indicate that the first copy of the page in Non-Volatile Data Storage 118 has been successfully overwritten with New Version of Page 143. Such an updated value for Write Completion Status 162 may, for example, be a "FIRST COPY WRITTEN" state or the like. After a second copy of the page is successfully overwritten with New Version of Page 143 (e.g. after Page Copy 2 172 is completely overwritten with New Version of Page 143), Non-Volatile Data Storage Read/Write Logic 144 may update Write Completion Status 162 to indicate that the second copy of the page in Non-Volatile Data Storage 118 has been successfully overwritten with New Version of Page 143. Such an updated value for Write Completion Status 162 may, for example, be a "SECOND COPY WRITTEN" state or the like. As further copies of the page in Non-Volatile Data Storage 118 are overwritten with New Version of Page 143, Non-Volatile Data Storage Read/Write Logic 144 similarly updates Write Completion Status 162 to indicate a last copy of the page that was successfully overwritten, thus causing Write Completion Status 162 to always indicate which ones of the copies of the page have been successfully overwritten with New Version of Page 143. After the last copy of the page (e.g. Page Copy N 174) is successfully overwritten with New Version of Page 143, Non-Volatile Data Storage Read/Write Logic 144 sends an acknowledgement to Application 142, indicating successful completion of the page write, e.g. as one of the Page Write Acknowledgements 152. Receipt of the acknowledgement indicating successful completion of the page write indicates to Application 142 that the transaction is complete, and that Current Transaction Sequence Number 156 and Set of Modifications 158 need no longer be maintained in Protected Memory 132. Accordingly, Application 142 may then discard or otherwise remove Set of Modifications 158 from Protected Memory 132, thus making space available in Protected Memory 132 to store another set of modifications for another page write performed by Application 142, and Current Transaction Sequence Number 156 can be incremented to generate a new transaction sequence number for use during another page write performed by Application 142.

In response to a failure occurring and being detected after Application 142 issues the page write to Non-Volatile Data Storage Read/Write Logic 144 and prior to Non-Volatile Data Storage Read/Write Logic 144 successfully overwriting all copies of the page in Non-Volatile Data Storage 118 with New Version of Page 143 and sending an acknowledgement indicating successful completion of the page write to Application 142, Non-Volatile Data Storage Read/Write Logic 144 recovers from the failure by selecting a copy of the page to be returned to Application 142 as the Current Version of Page 147 after the failure based on the contents of Write Completion Status 162. For example, in response to the failure, Non-Volatile Data Storage Read/Write Logic 144 may determine which, if any of the copies of the page were successfully overwritten with New Version of Page 143. In the case where after the failure Write Completion Status 162 contains the initial value, e.g. "START TRANSACTION", then Non-Volatile Data Storage Read/Write Logic 144 determines that none of the copies of the page were successfully overwritten with New Version of Page 143 before the failure, and that the first copy of the page may have been partially overwritten at the time the failure occurred. Accordingly, Non-Volatile Data Storage Read/Write Logic 144 overwrites the first copy of the page, e.g. Page Copy 1 170, with the second copy of the page (e.g. Page Copy 2 172), to ensure that Page Copy 1 170 is not in a corrupted state. All copies of the page in Non-Volatile Data Storage 118 are then the same as the page before the page write was passed from Application 142 to Non-Volatile Data Storage Read/Write Logic 144. Non-Volatile Data Storage Read/Write Logic 144 then returns a Current Version of Page 147 to Application 142 that is the same as Previous Version of Page 141, e.g. by passing Page Copy 1 170 to Application 142 as Current Version of Page 147. Application 142 then retrieves the transaction sequence number from Current Version of Page 147, and determines that the transaction sequence number in Current Version of Page 147 is less than Current Transaction Sequence Number 156. In response to determining that the transaction sequence number in Current Version of Page 147 is less than Current Transaction Sequence Number 156, Application 142 re-applies Set of Modifications 158 to the page.

In response to Write Completion Status 162 containing, after detection of the failure, a value other than the initial value, e.g. a value other than "START TRANSACTION", Non-Volatile Data Storage Read/Write Logic 144 determines that at least one of the copies of the page was successfully overwritten with New Version of Page 143 before the failure. Exactly which copies were successfully overwritten before the failure is indicated by the specific value of Write Completion Status 162 after the failure. For example, in the case where only the first copy of the page (e.g. Page Copy 1 170) was successfully overwritten with New Version of Page 143 before the failure occurred, Write Completion Status 162 contains the "FIRST COPY WRITTEN" state. Accordingly, in response to the failure, and in response to Write Completion Status 162 contains "FIRST COPY WRITTEN", Non-Volatile Data Storage Read/Write Logic 144 overwrites the remaining copies of the page (e.g. Page Copy 2 172 and so on through Page Copy N 174) with the contents of the first copy of the page (e.g. Page Copy 1 170), so that all copies of the page in Non-Volatile Data Storage 118 are then the same as New Version of Page 143. Non-Volatile Data Storage Read/Write Logic 144 then returns a Current Version of Page 147 to Application 142 that is the same as New Version of Page 143, e.g. by passing Page Copy 1 170 to Application 142 as Current Version of Page 147. A similar process may be performed by Non-Volatile Data Storage Read/Write Logic 144 for post-failure values of Write Completion Status 162 indicating that more than one of the copies of the page in Non-Volatile Data Storage 118 were successfully overwritten with New Version of Page 143 prior to occurrence of the failure, so that all copies of the page in Non-Volatile Data Storage 118 are made to be the same as New Version of Page 143, and a Current Version of Page 147 that is the same as New Version of Page 143 may be returned to Application 142. In such cases, Application 142 will then retrieve a transaction sequence number from Current Version of Page 147, and determine that the transaction sequence number in Current Version of Page 147 is the same as Current Transaction Sequence Number 156. Application 142 determines, in response to the transaction sequence number in Current Version of Page 147 being the same as Current Transaction Sequence Number 156, that Set of Modifications 158 need not be re-applied to the page, and that Current Transaction Sequence Number 156 and Set of Modifications 158 need no longer be maintained in Protected Memory 132. Application 142 then discards or otherwise deallocates Set of Modifications 158 from Protected Memory 132, making space available in Protected Memory 132 to store another set of modifications for the next page write performed by Application 142. Application 142 may then subsequently increment Current Transaction Sequence Number 156 to generate a new transaction sequence number as needed for use identifying a subsequent transaction during which another page write is performed.

While for purposes of concise illustration FIG. 1 shows Protected Memory 132 storing transaction state for performing only one page write (Application Page Write Transaction State 154 and NV Storage Page Write Transaction State 160), in some embodiments multiple page writes may be performed in parallel. In such embodiments, states of multiple open page write transactions may simultaneously be stored in Protected Memory 132, representing each one of multiple currently pending transactions.

Figure 2:
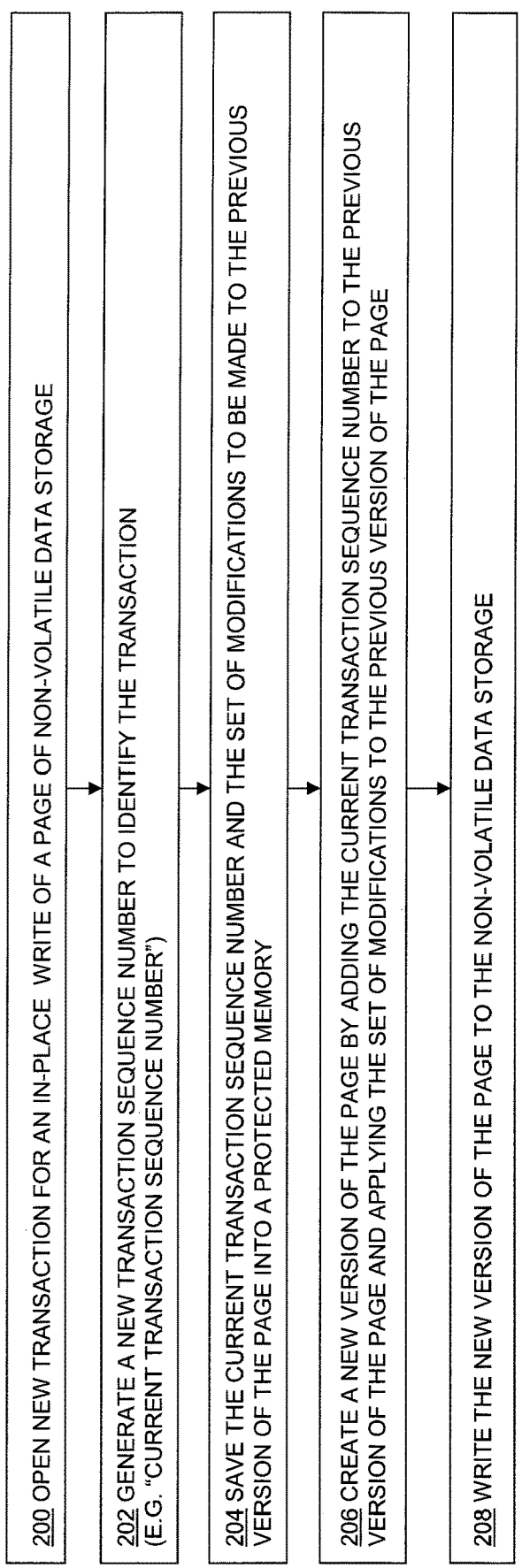
FIG. 2 is a flow chart showing an example of steps that may be performed in some embodiments, e.g. by an application, in order to perform a page write.

FIG. 2 is a flow chart showing an example of steps that may be performed in some embodiments, e.g. by an application such as Application 142 shown in FIG. 1, in order to write a page from memory to non-volatile data storage. At step 200, the application opens a new transaction for an in-place write of a page to non-volatile data storage. At step 202, the application generates a transaction sequence number to identify the new transaction, referred to for purposes of explanation as the "current transaction sequence number".

At step 204, the application saves the current transaction sequence number and the set of modifications that are to be made to the page by the page write, relevant to a previous version of the page, into a protected memory.

At step 206, the application creates a complete new version of the page in memory. The application creates the new version of the page by adding the current transaction sequence number to a previous version of the page retrieved from non-volatile data storage (e.g. by overwriting a previous transaction sequence number contained in a header or footer portion of the previous version of the page), and by applying the set of modifications stored in protected memory to the previous version of the page.

At step 208, the application writes the new version of the page to non-volatile data storage, e.g. by issuing a page write indicating or containing the new version of the page to non-volatile data storage read/write logic that is responsible for accessing and modifying copies of the page that are located in the non-volatile data storage.

Figure 3:
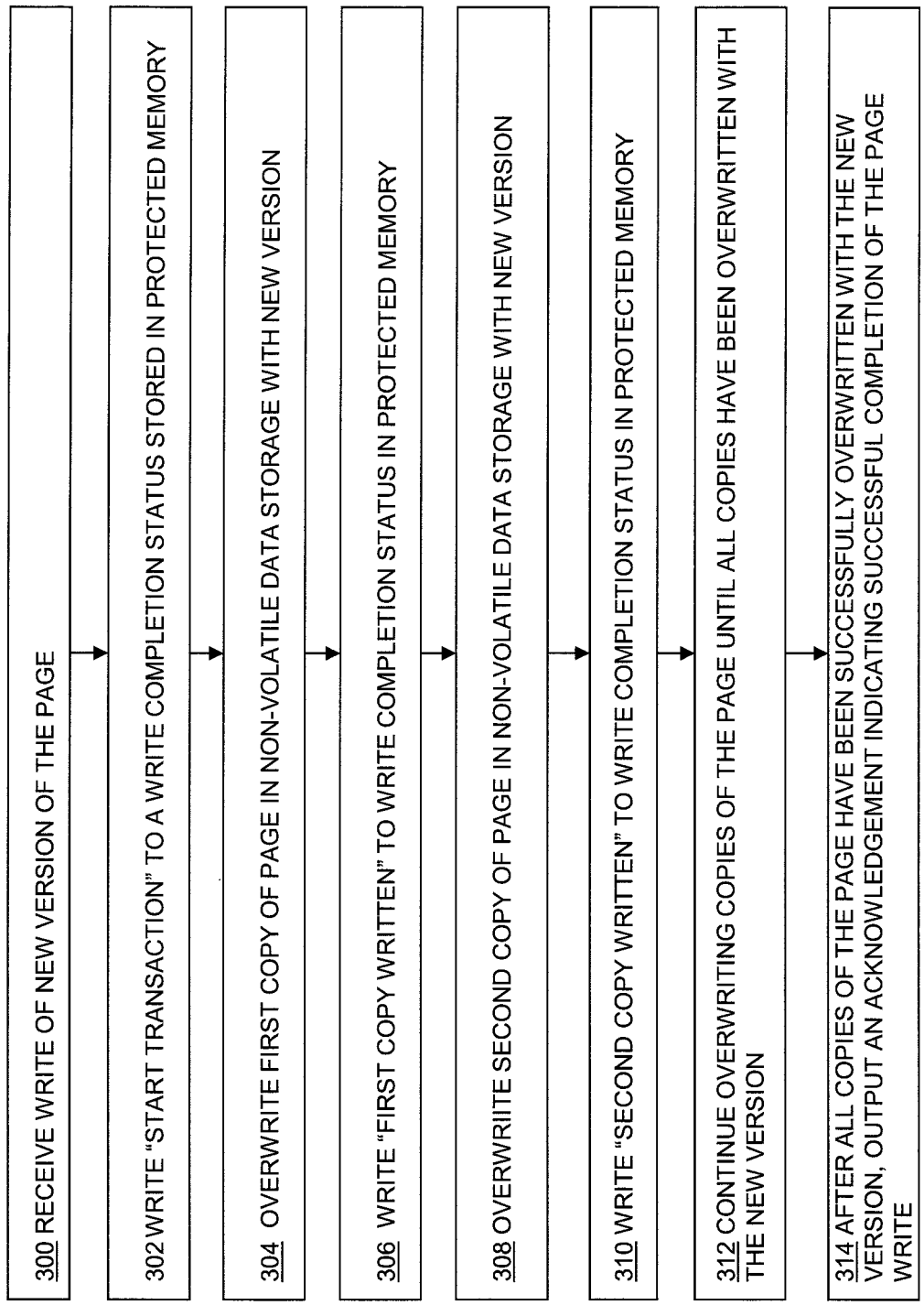
FIG. 3 is a flow chart showing an example of steps that may be performed in some embodiments, e.g. by non-volatile data storage read/write logic, in response to a page write.

FIG. 3 is a flow chart showing an example of steps that may be performed in some embodiments in response to receipt of a page write made by an application to non-volatile data storage. The steps of FIG. 3 may, for example, be performed by non-volatile data storage read/write logic that operates at least in part to write pages received from an application to non-volatile data storage, such as Non-Volatile Data Storage Read/Write Logic 144 shown in FIG. 1 or the like.

At step 300, the non-volatile data storage read/write logic receives a page write from the application. The page write indicates a new version of the page that is stored in memory, and that is to be used by the non-volatile data storage read/write logic to overwrite all copies of the page that are stored in non-volatile data storage.

At step 302, in response to receipt of the page write from the application, the non-volatile data storage read/write logic writes an initial value to a write completion status that is stored in protected memory. The initial value written to the write completion status indicates that the non-volatile data storage read/write logic has begun overwriting a first copy of the page in non-volatile data storage with the new version of the page. The initial value may, for example, be "START TRANSACTION" or the like.

At step 304, the non-volatile data storage read/write logic completely overwrites a first copy of the page in non-volatile data storage with the new version of the page.

At step 306, after the non-volatile data storage read/write logic has successfully overwritten the first copy of the page in non-volatile data storage, the non-volatile data storage read/write logic updates the write completion status stored in protected memory to indicate that the first copy of the page was successfully overwritten, e.g. by writing a "FIRST COPY OVERWRITTEN" state or the like to the write completion status.

At step 308, the non-volatile data storage read/write logic completely overwrites a second copy of the page in non-volatile data storage with the new version of the page.

At step 310, after the non-volatile data storage read/write logic has successfully overwritten the second copy of the page in non-volatile data storage, the non-volatile data storage read/write logic updates the write completion status stored in protected memory to indicate that the second copy of the page was successfully overwritten, e.g. by writing a "SECOND COPY OVERWRITTEN" state or the like to the write completion status.

At step 312, the non-volatile data storage read/write logic overwrites the remaining copies of the page in non-volatile data storage with the new version of the page and updates the write completion status stored in protected memory as each copy is overwritten (e.g. to "THIRD COPY OVERWRITTEN", "FOURTH COPY OVERWRITTEN", etc.), until all copies of the page have been overwritten.

At step 314, after all copies of the page in non-volatile data storage have been successfully overwritten with the new version of the page, the non-volatile data storage read/write logic outputs a page write acknowledgement to the application indicating that all copies of the page in non-volatile data storage have been successfully overwritten, and that the page write has accordingly been completed successfully. In response to receipt of the acknowledgement from the non-volatile data storage read/write logic, the application closes the current transaction, e.g. by discarding or otherwise deallocating the set of modifications corresponding to the current transaction sequence number from the protected memory, thus making space available in the protected memory store another set of modifications for the next page write performed by the application, and by allowing the previously stored current transaction sequence number to be subsequently incremented as needed for use identifying a subsequent transaction during which another page write is performed by the application.

Figure 4:
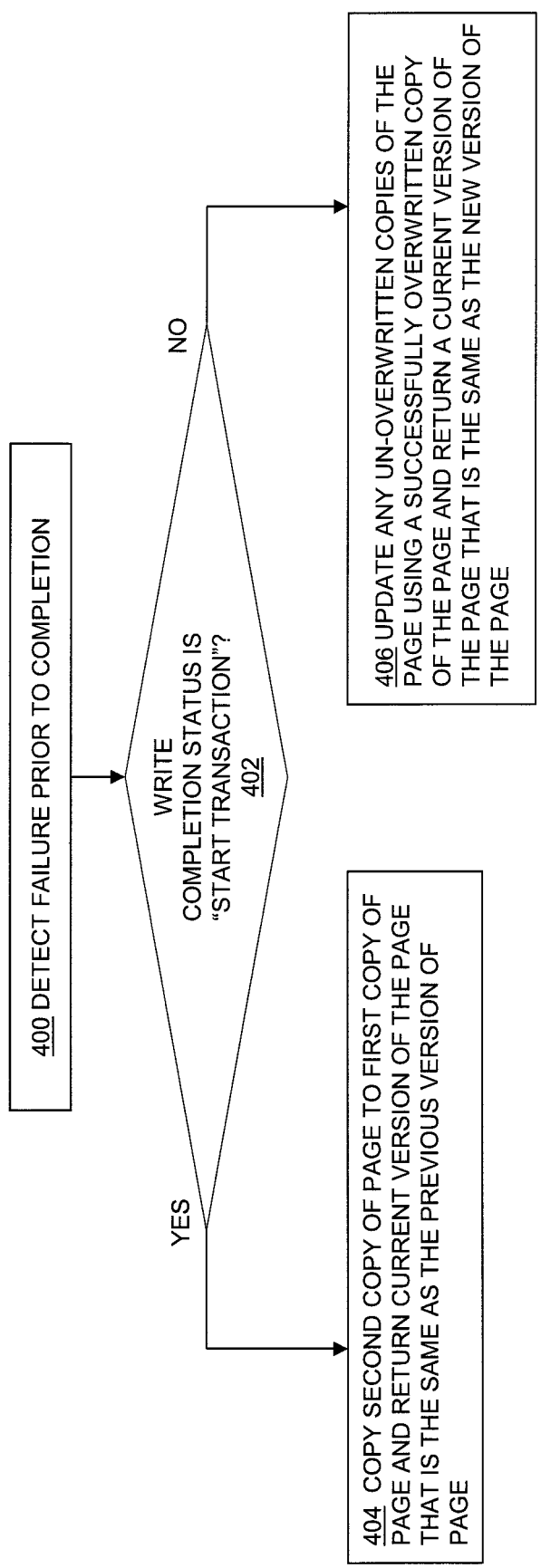
FIG. 4 is a flow chart showing an example of steps that may be performed in some embodiments, e.g. by non-volatile data storage read/write logic, in response to a failure.

FIG. 4 is a flow chart showing an example of steps that may be performed in some embodiments in response to detection of a failure while processing a page write issued by an application. The steps of FIG. 4 may, for example, be performed by non-volatile data storage read/write logic responsible for overwriting copies of the page in non-volatile data storage with a new version of the page that is contained in memory and indicated by the page write, such as Non-Volatile Data Storage Read/Write Logic 144 or the like.

At step 400, the non-volatile data storage read/write logic detects a failure prior to successfully completing a page write received from an application. For example, the failure may be detected after receipt of the page write from the application, but prior to the non-volatile data storage read/write logic successfully overwriting all copies of the page in non-volatile data storage with the new version of the page and sending an acknowledgement to the application indicating successful completion of the page write.

At step 402, in order to select a current copy of the page to be returned to the application after detection of the failure, the non-volatile data storage read/write logic first checks the write completion status stored in protected memory. If the write completion status indicates that no copies of the page were successfully overwritten with the new version of the page before the failure, then step 402 is followed by step 404. Otherwise, if at least one copy of the page was successfully overwritten with the new version of the page before the failure, then step 402 is followed by step 406. For example, in some embodiments, a post-failure write completion status of "START TRANSACTION" may indicate that after the page write was received and begun, no copies of the of the page were successfully overwritten with the new version of the page before the failure. Accordingly, in such embodiments, if the value of the write completion status after the failure is "START TRANSACTION", then step 402 is followed by step 404. Further in such embodiments, if the value of the write completion status after the failure is other than "START TRANSACTION" (e.g. "FIRST COPY OVERWRITTEN", "SECOND COPY OVERWRITTEN", "THIRD COPY OVERWRITTEN", etc.), then at least one of the copies of the page was successfully overwritten with the new version of the page before the failure, and step 402 is followed by step 406.

At step 404, because the first copy of the page may have been only partly overwritten prior to the failure, the first copy of the page is overwritten with the second copy of the page. A current version of the page is then returned to the application that is the same as the previous version of the page prior to the page write being passed to the non-volatile data storage read/write logic (e.g. a copy of the first copy of the page).

At step 406, one of the copies of the page that was successfully overwritten with the new version of the page prior to the failure is used to overwrite any copies of the page that were not successfully overwritten with the new version of the page prior to the failure. The copies of the page that were not successfully overwritten prior to the failure can be determined from the value of the write completion status. For example, a write completion status of "FIRST COPY OVERWRITTEN" indicates that the first copy of the page was successfully overwritten with the new version of the page, and that all copies other than the first copy of the page were not successfully overwritten with the new version of the page. Accordingly, in response to a write completion status value of "FIRST COPY OVERWRITTEN", at step 406 the non-volatile data storage read/write logic overwrites all copies of the page other than the first copy with the contents of the first copy. The non-volatile data storage read/write logic then returns a current version of the page to the application that is the same as the new version of the page (e.g. a copy of the first copy of the page).

Figure 5:
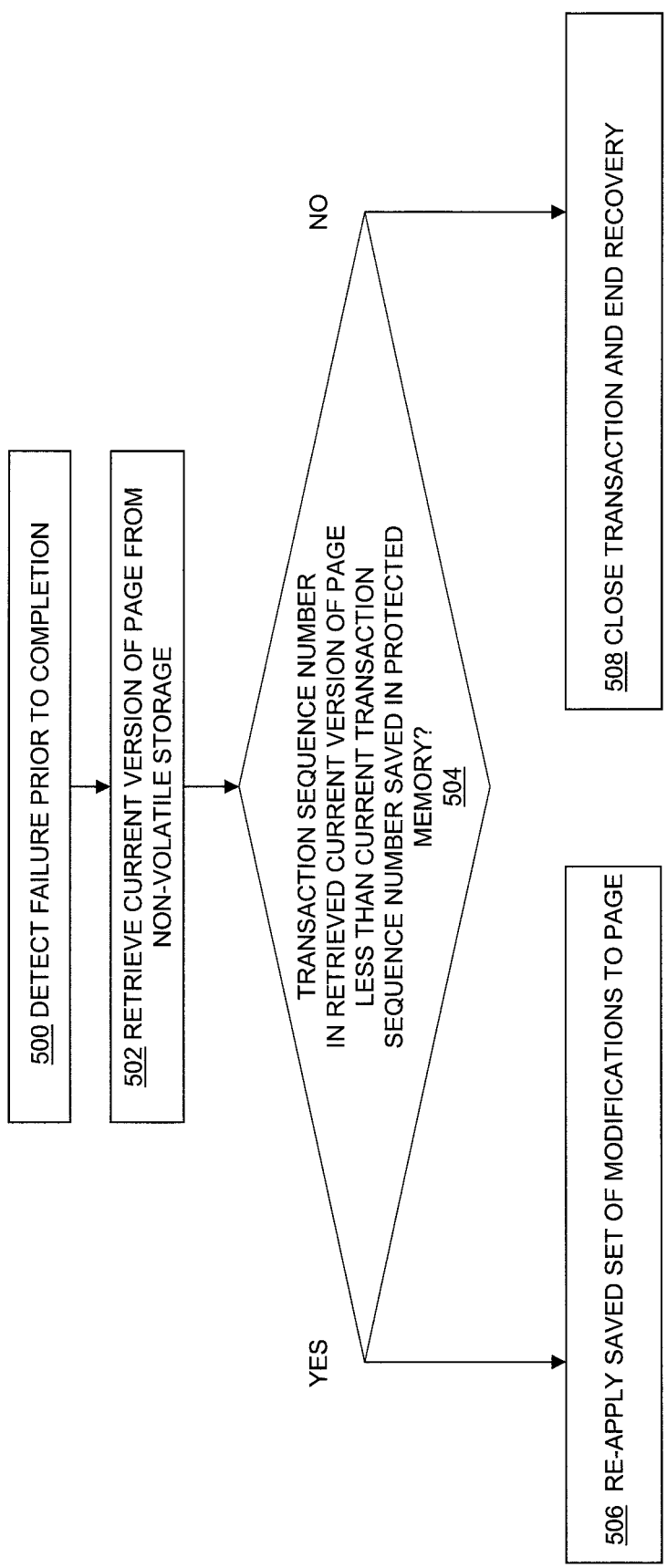
FIG. 5 is a flow chart showing an example of steps that may be performed in some embodiments, e.g. by an application, in response to a failure.

FIG. 5 is a flow chart showing an example of steps that may be performed in some embodiments, e.g. by an application (e.g. Application 142), in response to detection of a failure after initiating a page write to non-volatile data storage (e.g. by issuing a page write to non-volatile data storage read/write logic), but prior to receiving an acknowledgement indicating that the page write was successfully completed (e.g. prior to receipt of an acknowledgement indicating that all copies of the page in non-volatile data storage were successfully overwritten by non-volatile data storage read/write logic with the new version of the page).

At step 500, the application detects a failure after issuing a page write to non-volatile data storage (e.g. by issuing a page write to non-volatile data storage read/write logic), but prior to receiving an acknowledgement indicating that the page write was successfully completed.

At step 502, in response to the failure detected at step 500, in order to determine the post-failure state of the page, the application retrieves a current version of the page from non-volatile data storage. For example, at step 502, after the failure, the application issues a page read to non-volatile data storage read/write logic requesting that the non-volatile data storage read/write logic return a current version of the page as it exists in non-volatile data storage after the failure.

At step 504, the application compares a transaction sequence number contained in the current version of the page retrieved at step 502 to the current transaction sequence number previously stored in protected memory. If the transaction sequence number contained in the current version of the page retrieved at step 502 matches or is greater than the current transaction sequence number stored in the protected memory, then step 504 is followed by step 508. Otherwise, if the transaction sequence number contained in the current version of the page and retrieved at step 502 is less than the current transaction sequence number stored in the protected memory, then step 504 is followed by step 506.

At step 506, the application re-applies the set of modifications stored in the protected memory to the page, e.g. by re-creating the new version of the page in memory using the current version of the page, and then re-performing the page write of the new version of the page to non-volatile data storage, for example by issuing another page write to the non-volatile data storage read/write logic.

At step 508, the application does not re-apply the saved set of modifications, and instead closes the transaction and ends its recovery process for the current transaction, e.g. by discarding or otherwise deallocating the set of modifications corresponding to the current transaction sequence number from the protected memory, in order to make space available in the protected memory to store another set of modifications for the next page write performed by the application, and/or by allowing the previously stored current transaction sequence number to be subsequently incremented as needed for use identifying a subsequent transaction during which another page write is performed by the application.

FIG. 6 is a block diagram showing another example of components in some alternative embodiments together with an operational environment. In some embodiments illustrated by FIG. 6, each copy of the page in the non-volatile data storage contains an error-detecting code such as a cyclic redundancy check (CRC) or the like (e.g. within a header or footer of the page). For example, in the embodiments illustrated by FIG. 6, Page Copy 1 170 includes Error Detecting Code 179, Page Copy 2 172 includes Error Detecting Code 183, and so on through Page Copy N 174, which includes Error Detecting Code 187. Since all of the copies of the page in Mirror Copies of Page 164 are identical prior to the page write of New Version of Page 143 to Non-Volatile Data Storage 118, Error Detecting Code 179, Error Detecting Code 183, and so on through Error Detecting Code 187 are the same value prior to the page write of New Version of Page 143 to Non-Volatile Data Storage 118.

As further illustrated in FIG. 6, Application 142 calculates an Error Detecting Code 149 for the New Version of Page 143 prior to writing New Version of Page 143 to Non-Volatile Data Storage 118, e.g. prior to issuing the page write of New Version of Page 143 to Non-Volatile Data Storage Read/Write Logic 144. For example, Application 142 may calculate an Error Detecting Code 149 that consists of a CRC that is a remainder of a polynomial division performed on New Version of Page 143. Application 142 also adds Error Detecting Code 149 to New Version of Page 143 (e.g. in a header or footer of New Version of Page 143) prior to writing New Version of Page 143 to Non-Volatile Data Storage 118 (e.g. prior to issuing the page write indicating New Version of Page 143 to Non-Volatile Data Storage Read/Write Logic 144).

In response to a failure occurring subsequent to Application 142 issuing a page write indicating New Version of Page 143 to Non-Volatile Data Storage Read/Write Logic 144 and prior to all copies of the page in Non-Volatile Data Storage 118 having been successfully overwritten with New Version of Page 143 and an acknowledgement sent from Non-Volatile Data Storage Read/Write Logic 144 to Application 142, Non-Volatile Data Storage Read/Write Logic 144 may select one of the copies of the page to be returned to Application 142 as the current version of the page after the failure by sequentially checking the copies of the page (e.g. first checking Page Copy 1 170, then checking Page Copy 2 172, and so on through Page Copy N 174) until a copy is found that has a valid error detecting code, indicating that the copy is not in a corrupted state. For example, a valid error detecting code for a copy may be found when a CRC that is calculated for the copy (e.g. a remainder of a polynomial division performed on the copy) matches the error detecting code that is contained in the copy. The first copy of the page that is found to have a valid error detecting code in the sequence of pages from Page Copy 1 170 through Page Copy N 174 is then returned as the Current Version of the Page 147. In some embodiments, Application 142 may itself sequentially check the copies of the page after the failure is detected until a copy of the page is found with a valid error detecting code, and then use that copy of the page as Current Version of Page 147 for purposes of determining whether or not the Set of Modifications 158 needs to be re-applied, based on the comparison of the transaction sequence number contained in Current Version of Page 147 to Current Transaction Sequence Number 156, as described above. In some embodiments, either the first or second copy of the page in the sequence of page copies will always have a valid error detecting code after the failure. After one of the copies of the page is located having a valid error detecting code, that copy of the page may also be used to overwrite one or more other copies of the page as needed so that all copies of the page are identical to the first copy of the page having a valid error detecting code within the sequence of copies of the page.

Figure 7:
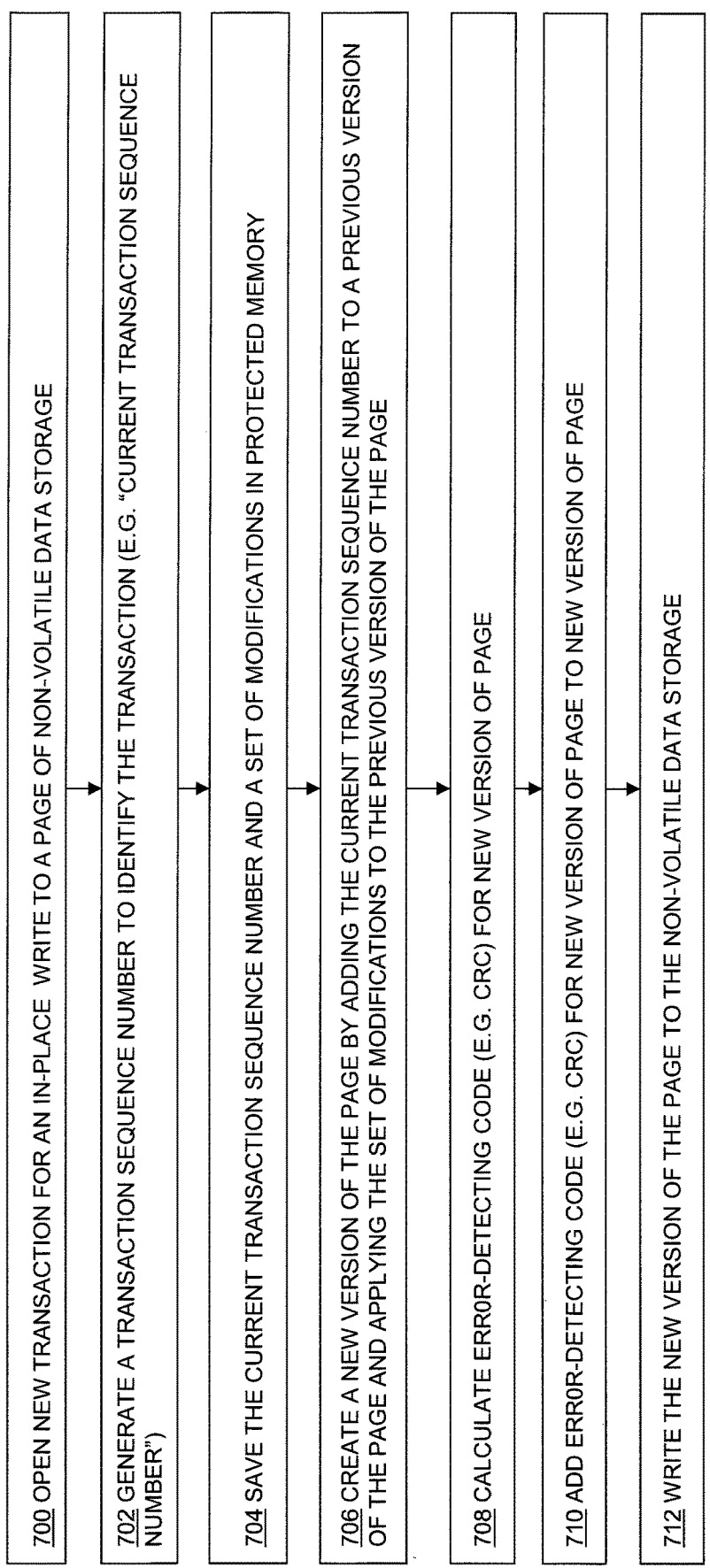
FIG. 7 is a flow chart showing an example of steps that may be performed in alternative embodiments as illustrated in FIG. 6, e.g. by an application, in order to perform a page write.

FIG. 7 is a flow chart showing an example of steps that may be performed in alternative embodiments illustrated by FIG. 6, e.g. by an application such as Application 142, in order to write a page to non-volatile data storage such as Non-Volatile Data Storage 118. Steps 700 through 706 may be the same as steps 200 through 206 described above with reference to FIG. 2. Specifically, at step 700, the application opens a new transaction for an in-place write of a page to non-volatile data storage. At step 702, the application generates a transaction sequence number to identify the new transaction, e.g. the "current transaction sequence number". At step 704, the application saves the current transaction sequence number and the set of modifications that are to be made to the page by the page write, relevant to the Previous Version of the Page 141, into the Protected Memory 132. At step 706, the application creates a complete new version of the page in memory, e.g. New Version of Page 143. The application creates New Version of Page 143 by i) adding the current transaction sequence number Previous Version of Page 141, where Previous Version of Page 141 was previously retrieved from non-volatile data storage, e.g. by overwriting a previous transaction sequence number contained in a header or footer portion of Previous Version of Page 141, and ii) applying Set of Modifications 158 to Previous Version of Page 141.

At step 708, the Application 142 calculates an error-detecting code, such as a cyclic redundancy check (CRC), for New Version of Page 143.

At step 710, the Application 142 adds the error detecting code calculated at step 708 to New Version of Page 143, e.g. within a header or footer of New Version of Page 143, as shown in FIG. 6 by Error Detecting Code 149.

Step 712 may be the same as step 208 described above with reference to FIG. 2, in which Application 142 writes New Version of Page 143 to Non-Volatile Data Storage 118, e.g. by issuing a page write indicating or containing New Version of Page 143 to Non-Volatile Data Storage Read/Write Logic 144, albeit that in step 712 New Version of Page 143 includes Error Detecting Code 149.

Figure 8:
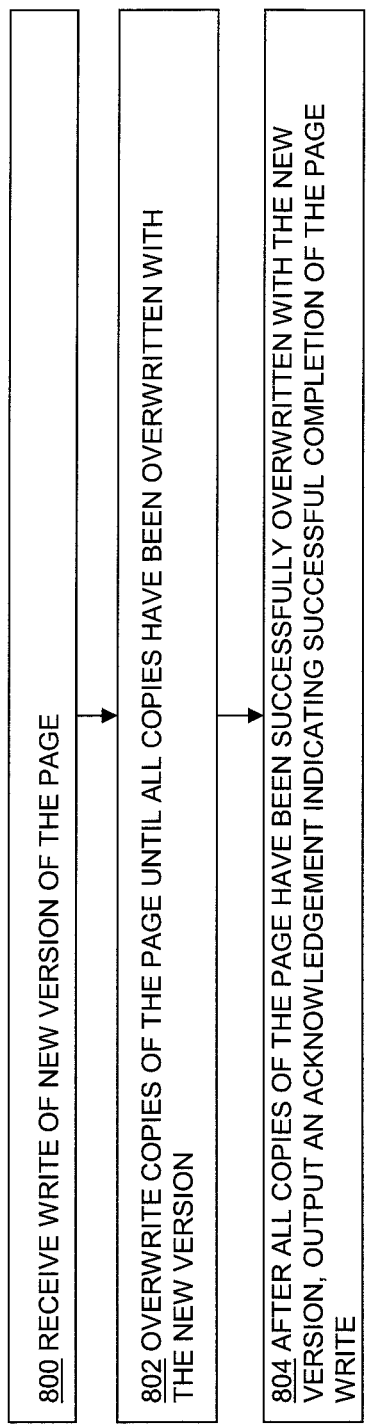
FIG. 8 is a flow chart showing an example of steps that may be performed in alternative embodiments illustrated in FIG. 6, e.g. by non-volatile data storage read/write logic, in response to a page write.

FIG. 8 is a flow chart showing an example of steps that may be performed in alternative embodiments illustrated by FIG. 6, in which an error detecting code is stored in each copy of the page in non-volatile data storage. The steps of FIG. 8 may, for example, be performed in some embodiments by Non-Volatile Data Storage Read/Write Logic 144, in response to the page write issued by Application 142 in step 712 of FIG. 7. At step 800, Non-Volatile Data Storage Read/Write Logic 144 receives the page write of New Version of Page 143 by Application 142, and the New Version of Page 143 includes Error Detecting Code 149. At step 802, Non-Volatile Data Storage Read/Write Logic 144 overwrites copies of the page in Non-Volatile Data Storage 118 until all copies of the page in Non-Volatile Data Storage 118 have been overwritten with New Version of Page 143. Notably, Non-Volatile Data Storage Read/Write Logic 144 does not need to persistently maintain a separate write completion status that is updated after overwriting each copy of the page, and accordingly Non-Volatile Data Storage Read/Write Logic 144 does not require any persistent memory for its operation. Accordingly, as shown in FIG. 6, Protected Memory 132 may only be needed to store Application Page Write Transaction State 154 that is accessed by Application 142, thus reducing overall protected memory requirements.

At step 804, after all copies of the page in Non-Volatile Data Storage 118 have been successfully overwritten with New Version of Page 143, Non-Volatile Data Storage Read/Write Logic 144 outputs a page write acknowledgement to the Application 142 indicating that all copies of the page in Non-Volatile Data Storage 118 have been successfully overwritten, and that the page write has been completed successfully. In response to receipt of the acknowledgement from the Non-Volatile Data Storage Read/Write Logic 144, Application 142 closes the current transaction, e.g. by discarding or otherwise deallocating Set of Modifications 158 corresponding to Current Transaction Sequence Number 156 from Protected Memory 132, thus making space available in Protected Memory 132 to store another set of modifications for a next page write performed by the application, and by allowing the previously stored Current Transaction Sequence Number 156 to be subsequently incremented as needed for use identifying a subsequent transaction during which another page write is performed by the Application 142.

Figure 9:
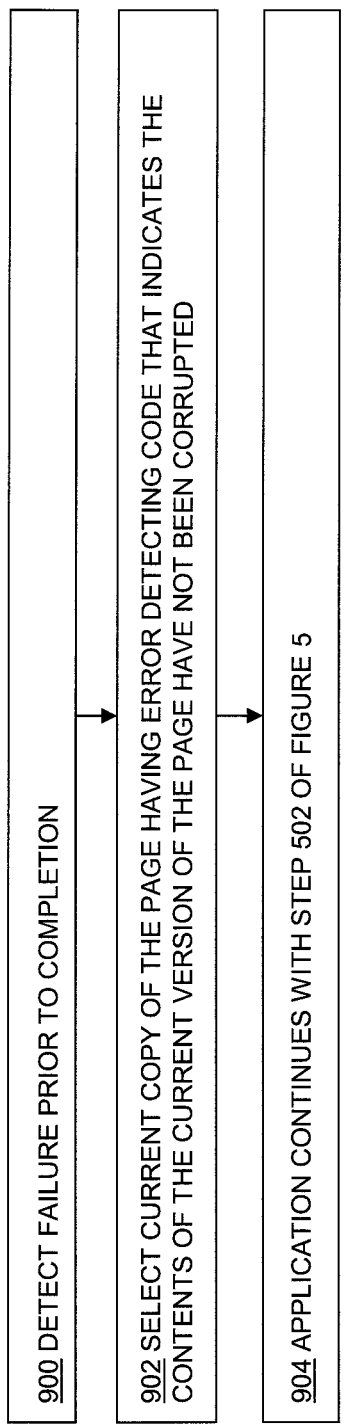
FIG. 9 is a flow chart showing an example of steps that may be performed in alternative embodiments as illustrated in FIG. 6, e.g. by an application and/or non-volatile data storage read/write logic, in response to a failure.

FIG. 9 is a flow chart showing an example of steps that may be performed in alternative embodiments as illustrated in FIG. 6, e.g. by Application 142 and/or Non-Volatile Data Storage Read/Write Logic 144, in response to a failure. At step 900, a failure is detected, e.g. prior to Non-Volatile Data Storage Read/Write Logic 144 successfully completing a page write of New Version of Page 143 received from Application 142. For example, the failure may be detected after Non-Volatile Data Storage Read/Write Logic 144 receives the page write of New Version of Page 143 from Application 142, where New Version of Page 143 includes Error Detecting Code 149, but prior to Non-Volatile Data Storage Read/Write Logic 144 successfully overwriting all copies of the page in Non-Volatile Data Storage 118 with the New Version of the Page 143 and sending an acknowledgement to Application 142 indicating successful completion of the page write.

At step 902, a copy of the page in Non-Volatile Data Storage 118 is selected as Current Version of Page 147 after the failure. The copy of the page that is selected as Current Version of Page 147 has a valid error detecting code, i.e. an error detecting code that indicates that the contents of the copy of the page has not been corrupted. For example, Non-Volatile Data Storage Read/Write Logic 144 or Application 142 may select one of the copies of the page in Non-Volatile Data Storage 118 as Current Version of Page 147 after the failure by sequentially checking the copies of the page (e.g. first checking Page Copy 1 170, then checking Page Copy 2 172, and so on through Page Copy N 174) until a copy is found that has a valid error detecting code, indicating that the copy is not in a corrupted state. The first copy of the page that is found to have a valid error detecting code in the sequence of pages from Page Copy 1 170 through Page Copy N 174 is used as the Current Version of the Page 147.

At step 904, Current Version of Page 147 is used by Application 142 for purposes of determining whether or not the Set of Modifications 158 needs to be re-applied, based on the comparison of the transaction sequence number contained in Current Version of Page 147 to Current Transaction Sequence Number 156, as for example described above beginning with Step 502 of FIG. 5, then continuing with Step 504 of FIG. 5, and then continuing with either step 506 or 508 of FIG. 5.

As will be appreciated by those skilled in the art, the technologies disclosed herein may be embodied as a system, method or computer program product. Accordingly, each specific feature of the present disclosure may be embodied using hardware, software (including firmware, resident software, micro-code, etc.) or a combination of software and hardware. Furthermore, the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art will readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media.

While the invention is described through the above exemplary embodiments, it will be understood by those of ordinary skill in the art that modification to and variation of the illustrated embodiments may be made without departing from the inventive concepts herein disclosed.

What is claimed is:

1. A method of performing a page-write to a page of non-volatile data storage, comprising:
    saving a set of modifications and a current transaction sequence number in a protected memory;
    creating a new version of the page of non-volatile data storage by adding the current transaction sequence number to a previous version of the page and applying the set of modifications to the previous version of the page;
    writing the new version of the page to non-volatile data storage; and
    in response to a failure, retrieving a current version of the page from the non-volatile data storage, comparing a transaction sequence number contained in the current version of the page to a current transaction sequence number, and re-applying the set of modifications to the page of non-volatile data storage in response to the transaction sequence number contained in the current version of the page being less than the current transaction sequence number.

2. The method of claim 1, wherein multiple copies of the page are maintained in the non-volatile data storage, each one of the multiple copies of the page containing a transaction sequence number, and further comprising:
    in response to the new version of the page being written to the non-volatile data storage,
        overwriting, within the non-volatile data storage, each of the multiple copies of the page with the new version of the page, and
        after each one of the multiple copies of the page is overwritten with the new version of the page, updating a write completion status stored in protected memory to indicate which ones of the multiple copies of the page have been successfully overwritten with the new version of the page.

3. The method of claim 2, further comprising:
    in response to the failure, selecting one of the multiple copies of the page as the current version of the page based on the write completion status stored in the protected memory.

4. The method of claim 3, wherein selecting one of the multiple copies of the page as the current version of the page based on the write completion status stored in the protected memory comprises:
    in response to the write completion status stored in the protected memory indicating that no copies of the multiple copies of the page have been successfully overwritten with the new version of the page to which the set of modifications were previously applied, selecting one of the multiple copies of the page as the current version of the page that is the same as the previous version of the page.

5. The method of claim 3, wherein selecting one of the multiple copies of the page as the current version of the page based on the write completion status stored in the protected memory comprises:
    in response to the write completion status saved in the protected memory indicating that at least one of the multiple copies of the page has been successfully overwritten with the new version of the page to which the set of modifications were previously applied, selecting one of the multiple copies of the page as the current version of the page that is the same as the new version of the page.

6. The method of claim 1, wherein multiple copies of the page are maintained in the non-volatile data storage, wherein each copy of the page in the non-volatile data storage has an error-detecting code stored therewith, and further comprising:
    calculating an error-detecting code for the new version of the page;
    adding the error-detecting code for the new version of the page to the new version of the page before writing the new version of the page to the non-volatile data storage; and
    in response to the failure, selecting one of the multiple copies of the page as the current version of the page such that the error-detecting code for the current version of the page indicates that a contents of the current version of the page have not been corrupted.

7. The method of claim 1, further comprising:
    prior to saving the current transaction sequence number to the protected memory, generating the current transaction sequence number by incrementing a last previously used transaction sequence number.

8. A data storage system, comprising:
    processing circuitry and memory coupled to the processing circuitry, the memory storing instructions, wherein the instructions, when executed by the processing circuitry, cause the processing circuitry to:
        save a set of modifications and a current transaction sequence number in a protected memory;
        create a new version of the page of non-volatile data storage by adding the current transaction sequence number to a previous version of the page and applying the set of modifications to the previous version of the page;
        write the new version of the page to non-volatile data storage; and
        in response to a failure, retrieve a current version of the page from the non-volatile data storage, compare a transaction sequence number contained in the current version of the page to a current transaction sequence number, and re-apply the set of modifications to the page of non-volatile data storage in response the transaction sequence number contained in the current version of the page being less than the current transaction sequence number.

9. The data storage system of claim 8, wherein multiple copies of the page are maintained in the non-volatile data storage, each one of the multiple copies of the page containing a transaction sequence number, and wherein the instructions, when executed by the processing circuitry, cause the processing circuitry to:
    in response to the new version of the page being written to the non-volatile data storage, overwrite, within the non-volatile data storage, each of the multiple copies of the page with the new version of the page, and after each one of the multiple copies of the page is overwritten with the new version of the page, update a write completion status stored in protected memory to indicate which ones of the multiple copies of the page have been successfully overwritten with the new version of the page.

10. The data storage system of claim 9, wherein the instructions, when executed by the processing circuitry, cause the processing circuitry to:

in response to the failure, select one of the multiple copies of the page as the current version of the page based on the write completion status stored in the protected memory.

11. The data storage system of claim 10, wherein the instructions, when executed by the processing circuitry, cause the processing circuitry to select one of the multiple copies of the page as the current version of the page based on the write completion status stored in the protected memory at least in part by causing the processing circuitry to:

in response to the write completion status stored in the protected memory indicating that no copies of the multiple copies of the page have been successfully overwritten with the new version of the page to which the set of modifications were previously applied, select one of the multiple copies of the page as the current version of the page that is the same as the previous version of the page.

12. The data storage system of claim 10, wherein the instructions, when executed by the processing circuitry, cause the processing circuitry to select one of the multiple copies of the page as the current version of the page based on the write completion status stored in the protected memory at least in part by causing the processing circuitry to:

in response to the write completion status saved in the protected memory indicating that at least one of the multiple copies of the page has been successfully overwritten with the new version of the page to which the set of modifications were previously applied, select one of the multiple copies of the page as the current version of the page that is the same as the new version of the page.

13. The data storage system of claim 8, wherein multiple copies of the page are maintained in the non-volatile data storage, wherein each copy of the page in the non-volatile data storage has an error-detecting code stored therewith, and wherein the instructions, when executed by the processing circuitry, further cause the processing circuitry to:

calculate an error-detecting code for the new version of the page;

add the error-detecting code for the new version of the page to the new version of the page before writing the new version of the page to the non-volatile data storage; and in response to the failure, select one of the multiple copies of the page as the current version of the page such that the error-detecting code for the current version of the page indicates that a contents of the current version of the page have not been corrupted.

14. The data storage system of claim 8, wherein the instructions, when executed by the processing circuitry, further cause the processing circuitry to:

prior to saving the current transaction sequence number to the protected memory, generate the current transaction sequence number by incrementing a last previously used transaction sequence number.

15. A computer program product, comprising:

a non-transitory, computer-readable medium having instructions stored thereon that, when executed by processing circuitry, cause the processing circuitry to perform a method comprising the steps of:

saving a set of modifications and a current transaction sequence number in a protected memory;

creating a new version of the page of non-volatile data storage by adding the current transaction sequence number to a previous version of the page and applying the set of modifications to the previous version of the page;

writing the new version of the page to non-volatile data storage; and in response to a failure, retrieving a current version of the page from the non-volatile data storage, comparing a transaction sequence number contained in the current version of the page to a current transaction sequence number, and re-applying the set of modifications to the page of non-volatile data storage in response to the transaction sequence number contained in the current version of the page being less than the current transaction sequence number.

* * * * *